__United States Patent__ [19]

Kicherer et al.

[11] 4,214,151

[45] Jul. 22, 1980

[54] CONTROL INSTRUMENT FOR ELECTRIC COOKER PLATES

[75] Inventors: Robert Kicherer, Knittlingen; Wilfried Schilling, Kraichtal, both of Fed. Rep. of Germany

[73] Assignee: E.G.O. Regeltechnik GmbH, Fed. Rep. of Germany

[21] Appl. No.: 922,027

[22] Filed: Jul. 5, 1978

[30] Foreign Application Priority Data

Jul. 14, 1977 [DE] Fed. Rep. of Germany ....... 2731782

[51] Int. Cl.$^2$ .............................................. H05B 1/02
[52] U.S. Cl. ................................... 219/492; 219/449; 307/106; 219/511; 219/509
[58] Field of Search ............... 219/490, 492, 493, 494, 219/497, 501, 511, 449; 307/106, 96

[56] References Cited

U.S. PATENT DOCUMENTS

| | | | |
|---|---|---|---|
| 3,155,815 | 11/1964 | Clapp | 219/492 |
| 3,251,980 | 5/1966 | Miles | 219/493 |
| 3,541,429 | 11/1970 | Martin | 219/492 |
| 3,588,448 | 6/1971 | Ziver | 219/511 |
| 4,134,005 | 1/1979 | Eppens | 219/492 |
| 4,135,122 | 1/1979 | Holmquist et al. | 219/492 |

Primary Examiner—B. A. Reynolds
Assistant Examiner—M. Paschall
Attorney, Agent, or Firm—Steele, Gould & Fried

[57] ABSTRACT

A control instrument is provided for electric cooker plates. The instrument comprises an adjustable quantizing power control instrument having an expansion element with an electric heating element and a time switch member for increasing the power adjusted on the power control instrument for a period in the initial cooking phase. The time switch member comprises an electronic counter timing member and at least one divider which, via an electronic switch element, reduces the power supplied to the heating element in a predetermined division ratio.

9 Claims, 3 Drawing Figures

CONTROL INSTRUMENT FOR ELECTRIC COOKER PLATES

BACKGROUND OF THE INVENTION

The invention relates to a control instrument for electric cooker plates, which comprises an adjustable power control instrument having an expansion element with an electric heating means, and a time switch member which increases the power adjusted on the power control instrument for a period in an initial cooking phase.

FIELD OF THE INVENTION

A control instrument of the above type, which is sometimes known as an automatic initial-cooking device, is known from German Offenlegungsschrift No. 23 10 867. In that Offenlegungsschrift, the electric cooker plate has two heating resistances for supplying cooking heat, of which the one with the lower power is turned on in the so-called continued-cooking range, that is to say the low to average power range. The larger heating resistance may be turned on selectively for a determined period by means of a mechanical timing mechanism with a timing member consisting of a heated bimetallic member, so that the power increases in the initial cooking phase. This timing mechanism operates very effectively and reliably, but is expensive and somewhat bulky owing to its mechanical make-up and the minimum of two switches which have to handle the full heating current. Reducing the size of the mechanism is also restricted by the fact that, in the low power range the power consumed by the heating means of the power control instrument is relatively high and it makes it difficult to dissipate this power from a very small body for the control instrument, particularly at high ambient temperatures. Furthermore, a design of cooker plate which uses two separate heating resistances for cooking which are switched separately is not permissible.

SUMMARY OF THE INVENTION

An object of the present invention is to provide a control instrument of the type mentioned above which is compact and not expensive.

According to the invention there is provided a control instrument for electric cooker plates, comprising an adjustable quantizing power control instrument having an expansion element with an electric heating means, and a time switch member for increasing the power adjusted on the power control instrument for a period in the initial cooking phase, the time switch member comprising an electronic counter timing member and at least one divider which, via an electronic switch element, reduces the power supplied to the heating means in a predetermined division ratio.

In this case, therefore, the entire time switch device is formed of electronic components. All mechanical parts for the timing member and the power switch are dispensed with since the electronic switch element has to switch only the very low power of the bimetallic member heating means for the power control instrument. The reliable quantizing power control instrument is however retained for switching the high cooker plate power. The cooker plate need have only one cooking heating resistance which is quantized by the power control instrument.

An embodiment in which the electronic switch element, which is preferably a thyristor, simultaneously acts as a diode, is particularly advantageous. In this case, the power of the bimetallic member which preferably lies parallel to the cooking heating resistance as a potential winding, can be somewhat higher, that is to say with a higher wire gauge, and therefore less sensitivity, without its power having to be selected very high. The division ratio of the time switch member is preferably from 2 and 8 and more preferably 5. The corresponding number of individual half-waves of the mains current is preferably let through by the electronic switch element. It is possible to ensure, by means of this division ratio, for example, that the highest continued-cooking power normally lying at about 20% of the total power can be brought to 100% in the continued-cooking range.

An additional electronic divider is preferably provided, which can be turned on independently of the counter in the higher power range of the electric cooker plate in order to reduce the power of the heating means. The power in the higher power range is reduced by this divider since, for example, only every second positive or negative half-wave is allowed through to the power control instrument, owing to a division ratio of 2. The heating-up period and thus the relative turning-on period of the electric cooker plate is prolonged by the lower power of the bimetallic member. The jump thus formed in the characteristic line is transformed by a corresponding design of the adjustment cam into a kink which not only causes interference but is even undesirable, so that during the transition from the boiling range into the frying range, the characteristic line is of a progressive nature, that is to say, a higher increase in power is allocated to a predetermined angle of adjustment (or division stroke) on the adjusting toggle in the higher power range.

The counter and the divider or dividers may be combined in an integrated circuit (IC) and thus be produced extremely economically and reliably on a large scale.

A temperature protection switch may also be provided which short circuits the electronic switch member, in particular when it acts as a diode, so that the full output power of the bimetallic member heating means is brought to bear and the relative switching on period is reduced by the corresponding factor. A restriction to a maximum cooker plate power in the order of magnitude of 20% of the output power is thus possible when an excessive temperature is detected by the temperature protection switch.

DESCRIPTION OF PREFERRED EMBODIMENT

Figure 1:
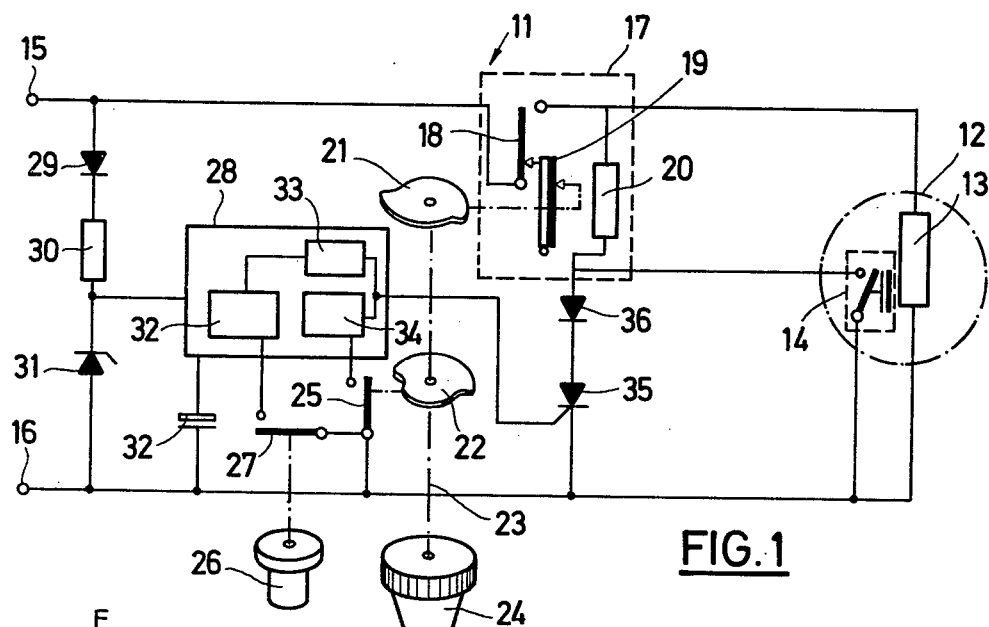
FIG. 1 is a schematic circuit diagram of a control instrument according to the invention.

FIG. 1 shows a control instrument 11 which is provided for the power control of an electric cooker plate 12 which has a cooking heating resistance 13 and a temperature protection switch 14. The control instrument 11 is connected by means of connections 15 and 16 to the domestic mains and has a conventional quantizing power control instrument 17 which is switched into a connection of the heating resistance 13 and feeds power to it in the form of power pulses, the relative switching-on period of which depends upon the adjustment of the power control instrument and its heating means. The mechanically/thermally operating power control instrument contains a snap switch 18 which is actuated by an expansion member 19, for example a bimetallic member. The expansion member is provided with a heating means 20 and is adjustable in its position relative to the switch 18 by the means of an adjusting cam 21.

The heating means 20 is switched in parallel with the heating resistance 13, that is to say as a potential winding, and can handle a relatively high power, for example as much as 20 Watts, so that it can be used even at higher mains voltages.

The adjusting cam 21 together with a switching cam 22 is placed on an adjusting shaft 23 which can be rotated manually by means of an adjusting toggle 24. The switching cam 22 actuates a switch contact 25. A push button 26 which may be actuated independently of the adjusting toggle 24 is also provided and can close a switch contact 27.

The control instrument 11 also comprises an integrated circuit (IC) 28, which is provided, via a bridge circuit consisting of a diode 29 with a resistance 30 on the one hand and a Zener diode 31 on the other hand, with a correspondingly lower voltage from the mains. A capacitor 32 is also connected to the current supply.

The IC comprises an electronic counter 32 and two dividers 33 and 34, which are shown as individual units. The counter forms a timing member, that is to say it allows a predetermined period of, for example, 9 minutes to elapse by counting the mains half-waves, before it emits an output signal to the divider 33. The counter 32 is started up by the contact 27, while the divider 34 is controlled directly by the contact 25. The output line of the IC leads from the dividers to a thyristor 35 which is connected in series with the heating means 20 of the power control instrument 17. A diode 36 is connected in series with it and acts as a protection from over-voltages.

The divider 33 is designed in such a way that it controls the thyristor 35 when the counter 32 is running so that the thyristor only allows every 5th half-wave of the mains current to pass through while the divider 34 is designed in such a way that it controls the thyristor to allow every 2nd half-wave of the alternating current to pass through when it is turned on by closure of the contact 25.

Figure 2:
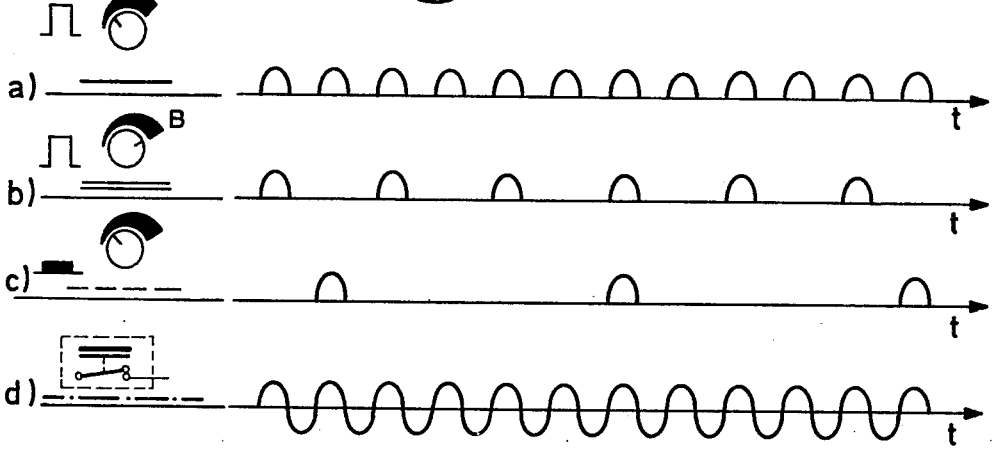
FIG. 2 is a chart of the power pulses fed to the heating means of the power control instrument in four different operating conditions of the control instrument according to the invention (a to d)

The mode of operation of the control instrument shown in FIG. 1 is described below with reference to FIGS. 2 and 3.

Figure 3:
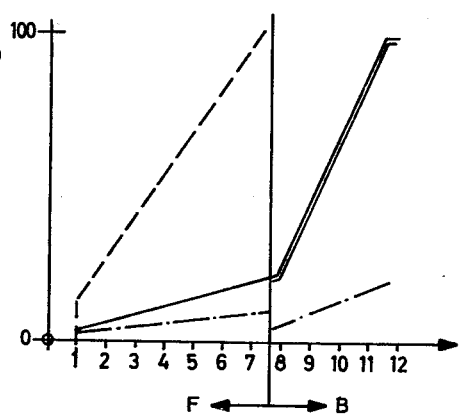
FIG. 3 is a schematic graph of the variation in power as a function of the power adjustment divided by from 1 to 12, the same type of line being used to denote the individual modes of operation in both FIGS. 2 and 3.

FIG. 2(a) shows the mode of operation of the control instrument in the low power range (continued cooking range F in FIG. 3). The simple solid line in the graph in FIG. 3 refers to this range. The automatic initial cooking device is not actuated, that is to say the press button 26 is not pressed. With this mode of operation, the heating means 20 receives only one half-wave of the mains current owing to the diode action of the thyristor 35, so that it heats with half of its output power, i.e. for example with 10 Watts. In this continued cooking range, powers of the order of magnitude of one tenth of the total output power of the cooker plate 12 are normally needed so that the associated relative switching-on period in this continued-cooking range reaches a maximum of about 20%. Since the bimetallic member heating means is invariably effective only when the switch 18 is closed, i.e. also only for a maximum of about 1/5th of the total time, the total power loss in the power control instrument is about 1/5th of 10 Watts, i.e. 2 Watts. In this operating condition, the switch 25 is kept open by the control cam 22.

Now if, according to FIG. 2(b), the control instrument is turned into frying range B, by rotation of the adjusting toggle 24, then the contact 25 is closed. The divider 34 is started up and ensures that the thyristor 35 allows only every 2nd half-wave of the alternating current through, so that the output power of the heating means 20 is only ¼th effective, i.e. an effective power of 5 Watts is present with 20 Watts output power. In order to compensate the jump in power, which would thus occur for the cooker plate, the adjusting cam 21 is shaped accordingly. As shown in FIG. 3 (double continuous line) an undesirable kink occurs in the characteristic line during the transition from the continued-cooking range F into the frying range B, but no jump. The characteristic line is set out in such a way that the full power (100%) is achieved somewhat before the end of the adjusting scale. No initial cooking support is provided in this upper power range (frying range). The power loss of the control instrument also remains small.

In FIG. 2(c), a power in the continued-cooking range F is adjusted and the initial cooking button 26 is actuated. The counter 32 is thus started up and activates the divider 33 in such a way that the thyristor 35 only allows each 5th half-wave through, i.e. has only 1/10th of the output power or 1/5th of the power normally supplied to the heating means 20 in the continued cooking range (FIG. 2(a)). The heating-up of the bimetallic member 19 thus lasts substantially longer and the relative switching on period is increased by about 5 fold. This therefore means that while the counter 32 runs, the power adjusted on the toggle 24 is increased 5 fold (broken line in FIG. 3). With a constant period of this initial cooking support, a power which has been increased by a fixed amount is therefore supplied, which power is however dependent upon the adjustment of the control instrument. The power loss is also very low in this case, and is not more than 2 Watts.

FIG. 2(d) illustrates the case in which the temperature protection switch 14 responds to the cooker plate 12 and short circuits the thyristor 35 and the diode 36. In this case, the heating means 20 is connected to full mains voltage and receives its total output power of, for example 10 Watts. The bimetallic member 19 is thus heated extremely rapidly and the heating resistance 13 is turned off. Since the bimetallic member power is twice as high in the initial cooking range (in which the temperature protection switch will rarely respond), is 4 times as great in the frying range B and is even 10 times as great in the case where the automatic time switch mechanism is pressed as previously, the power is suppressed very rapidly to the characteristic line shown as a broken line in FIG. 3. The maximum cooker plate power released when the temperature protection switch 14 responds is of the order of magnitude of somewhat above 20% at the highest power adjustment. The average power loss of the control instrument is thus about 4 Watts.

It should therefore be noted that the invention provides an instrument which is an initial cooking aid and at the same time keeps the power loss of the instrument, i.e. the internal consumption, very low with a minimum of mechanical outlay and use of reliable electronic components which are not susceptible to rapid wear. Owing to the small size of the electronic components and the absence of expensive mechanical parts, the regulator may be produced in a very small size, to which the small power loss also greatly contributes and avoids undesirable heating up of the control instrument. Furthermore, the instrument can have a very effective protection against over-heating which can operate with a very simple temperature protection switch. Since this switch switches only the low power of the control heating means 20 it can be designed, for example, as a crawling contact without snap mechanism.

The control instrument may be produced very simply, since the mechanical energy regulator and the electronic components form one structural unit in which the electronic components are saddled on to the power control instrument. A printed circuit board may be used in which the electronic components and the electric connecting parts are soldered into the power control instrument.

We claim:

1. A control instrument for an electric cooker plate, comprising a manually, substantially steplessly adjustable power control instrument which feeds electrical power to the cooker plate in the form of power pulses, having an expansion element with an electric heating means, and a time switch member for increasing the power adjusted on the power control instrument for a predetermined period in an initial cooking phase, the time switch member comprising an electronic counter timing member and at least one divider which, via an electronic switch element, reduces the power supplied to the heating means during said period in a predetermined division ratio, whereby the power fed to the cooker plate is raised according to said predetermined division ratio and in dependence upon the manual adjustment of the control instrument.

2. A control instrument according to claim 1, wherein the electronic switch element simultaneously acts as a diode.

3. A control instrument according to claim 1, wherein the electronic switch element is a thyristor.

4. A control instrument according to claim 1, wherein the division ratio is between 2 and 8.

5. A control instrument according to claim 4, wherein the division ratio is 5.

6. A control instrument according to claim 1, wherein the time switch member allows only individual half-waves of the mains current through at any time.

7. A control instrument according to claim 1, further comprising an additional electronic divider which can be turned on independently of the counter in a higher power range of the electric cooker plate in order to lower the power of the said heating means.

8. A control instrument according to claim 1, wherein the counter and the divider or dividers are contained in an integrated circuit.

9. A control instrument according to claim 1, wherein a temperature protection switch is provided on the electric cooker plate and is adapted to short-circuit the electronic switch member in order to supply full power to the said heating means.

* * * * *